(No Model.)
H. H. WARD.
STEAM ENGINE VALVE.
No. 506,141.
Patented Oct. 3, 1893.
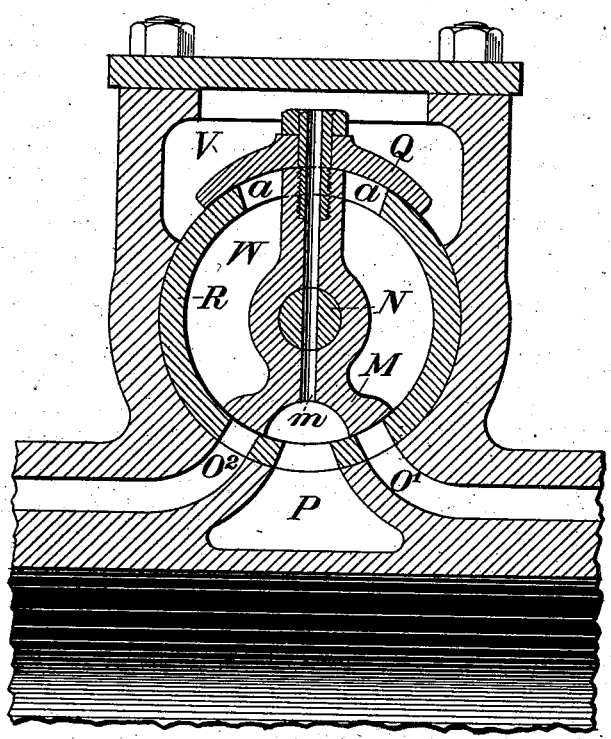
Witnesses:
Inventor:

UNITED STATES PATENT OFFICE.

HENRY H. WARD, OF SAN FRANCISCO, CALIFORNIA.

STEAM-ENGINE VALVE.

SPECIFICATION forming part of Letters Patent No. 506,141, dated October 3, 1893.

Application filed February 1, 1893. Serial No. 460,534. (No model.)

*To all whom it may concern:*

Be it known that I, HENRY H. WARD, of the city and county of San Francisco, State of California, a citizen of the United States, have made certain new and useful Improvements in Balancing Steam-Engine Valves, also applicable to other fluid-engines; and I hereby declare the following specification and the drawings therewith, and forming a part of the same, to be a full, clear, and exact description of my invention, also showing the mode of constructing and applying the same.

My invention relates to balancing steam or other fluid engine valves, having either a sliding or oscillating movement, and consists in a superimposed and opposing plate connected to the valve, and moving therewith, on a seat or seats in the same plane, steam pressure being admitted between the valve and balancing plate, the exposed area of the latter being sufficient to balance, or nearly balance, the pressure on the back of the valve. The sliding surfaces of the valve and balancing plate being, as before said, in one plane, and in the same relative position, so the wearing of either will be compensated by the wear of the other, and thus maintain a self-adjusting and steam-tight joint by the natural wear of the sliding surfaces.

Referring to the drawing herewith, the figure given represents a transverse view mainly in section, of an oscillating valve constructed according to my invention.

M is an oscillating valve, mounted on and driven by the stem N.

O' and O' are steam or induction ports, and P the exhaust or eduction port.

Q is the balancing plate, and R a lining bush or shell in which the valve M fits. Ports are cut in this shell R at the bottom side, corresponding to those O' O² and P, in the main casting, also a sufficient aperture at the top to connect the balance plate E to the valve M, as shown in the drawing.

The balancing plate Q is curved on its interior face to fit over the exterior of the shell or bushing R, and is bolted to the top of the valve M, as shown.

At $a\ a$ are left clearances at each side of the valve to permit the required range of oscillation; the length the other way, and parallel to the axis of the valve, being made sufficient so the exposed or inside area of the balance plate Q, will be sufficient to compensate for the ports below, and hold the valve M in equilibrium, or nearly so.

Steam is admitted to the chamber W from the ends in the usual manner, and any escaping into the chamber V above the balance plate, passes down through the small hole $m$, or any other suitable connection, to the exhaust way. In this manner it will be seen that my improvement is applicable to an oscillating valve, whether such valves have the complete functions of induction and eduction, or, as in the case of Corliss engines, or others, that employ two or more valves, independently for inlet and exhaust, also that the surfaces or bearings of the balancing plates, whether flat or curved, coincide with and wear alike with the valve seats, and that any break or unequal bearing between the two tends to correct itself in use.

Having thus explained the nature and objects of my invention, what I claim as new, and desire to secure by Letters Patent, is—

1. In a steam valve, the combination of the oscillating valve, having induction and eduction ports, a shell containing said valve likewise having ports therein and a curved balancing plate fitted on the exterior of said shell and secured to the valve, substantially as described.

2. In a steam engine valve, the combination of the oscillating valve having induction and eduction ports, a shell or bushing inclosing said valve and having ports cut in the lower portion thereof which correspond with the ports in the valve and having also an opening in its upper portion, and a curved balancing plate which fits over the exterior of the shell and is secured to a portion of the valve which lies within the upper opening in the shell, substantially as described.

In testimony whereof I have hereunto affixed my signature in the presence of two witnesses.

HENRY H. WARD.

Witnesses:
ALFRED A. ENQUIST,
WILSON D. BENT, Jr.